(12) United States Patent
Stanforth et al.

(10) Patent No.: US 9,137,740 B2
(45) Date of Patent: Sep. 15, 2015

(54) SYSTEM AND METHOD FOR PROVIDING NETWORK ACCESS TO ELECTRONIC DEVICES USING BANDWIDTH PROVISIONING

(75) Inventors: Peter Stanforth, Winter Springs, FL (US); Jeffrey C. Schmidt, Orlando, FL (US); Manish Shukla, Altamonte Springs, FL (US)

(73) Assignee: Spectrum Bridge, Inc., Lake Mary, FL (US)

( * ) Notice: Subject to any disclaimer, the term of this patent is extended or adjusted under 35 U.S.C. 154(b) by 225 days.

(21) Appl. No.: 13/607,968

(22) Filed: Sep. 10, 2012

(65) Prior Publication Data

US 2014/0075025 A1 Mar. 13, 2014

(51) Int. Cl.
| | | |
|---|---|---|
| *H04W 48/14* | (2009.01) | |
| *H04W 8/12* | (2009.01) | |
| *H04W 8/22* | (2009.01) | |
| *H04W 48/18* | (2009.01) | |
| *H04W 84/12* | (2009.01) | |
| *H04W 88/06* | (2009.01) | |

(52) U.S. Cl.
CPC .............. *H04W 48/14* (2013.01); *H04W 8/12* (2013.01); *H04W 8/22* (2013.01); *H04W 48/18* (2013.01); *H04W 84/12* (2013.01); *H04W 88/06* (2013.01)

(58) Field of Classification Search
CPC . H04W 28/24; H04W 28/0268; H04W 28/18; H04W 4/26; H04W 72/10; H04L 41/0893; H04L 63/101; H04L 41/5003; H04L 65/80; H04L 47/805
USPC ............. 709/203, 223–225; 455/456.6, 414.2
See application file for complete search history.

(56) References Cited

U.S. PATENT DOCUMENTS

| | | |
|---|---|---|
| 5,608,727 A | 3/1997 | Perreault et al. |
| 5,729,531 A | 3/1998 | Raith et al. |
| 7,088,997 B1 | 8/2006 | Boehmke |
| 7,460,837 B2 | 12/2008 | Diener |
| 2003/0032399 A1 | 2/2003 | Slupe |
| 2003/0135596 A1 | 7/2003 | Moyer et al. |
| 2004/0003060 A1 | 1/2004 | Asoh et al. |
| 2004/0087310 A1 | 5/2004 | Williamson et al. |
| 2004/0127252 A1 | 7/2004 | Tsunomoto et al. |
| 2006/0031082 A1 | 2/2006 | Amaitis et al. |
| 2006/0083205 A1 | 4/2006 | Buddhikot et al. |
| 2006/0143111 A1 | 6/2006 | Mylet |
| 2006/0174017 A1 | 8/2006 | Robertson |

(Continued)

OTHER PUBLICATIONS

International Search Report and Written Opinion from corresponding International Application No. PCT/US2013/056572, mailed on Apr. 14, 2014.

(Continued)

*Primary Examiner* — Wing F Chan
*Assistant Examiner* — Benjamin M Thieu
(74) *Attorney, Agent, or Firm* — Tucker Ellis LLP

(57) ABSTRACT

Systems and methods of providing network access information from one or more servers to a wireless device. The wireless device acquires information from the servers about available networks at a current location of the wireless device. The network information is based on a plurality of device parameters, network parameters and regulatory requirements that govern the operation of the wireless device. In addition, the wireless device may assess the acquired information for suitability for communications to be carried out by the wireless device.

16 Claims, 6 Drawing Sheets

(56) References Cited

U.S. PATENT DOCUMENTS

| | | |
|---|---|---|
| 2006/0182169 A1 | 8/2006 | Belge et al. |
| 2006/0234713 A1 | 10/2006 | Oswal et al. |
| 2007/0207750 A1 | 9/2007 | Brown et al. |
| 2008/0060066 A1* | 3/2008 | Wynn et al. ............... 726/6 |
| 2008/0108365 A1 | 5/2008 | Buddhikot et al. |
| 2008/0151743 A1 | 6/2008 | Tong et al. |
| 2008/0183634 A1 | 7/2008 | Sadler |
| 2008/0186882 A1 | 8/2008 | Scherzer et al. |
| 2008/0200157 A1* | 8/2008 | Averbuch et al. ............ 455/416 |
| 2008/0221951 A1 | 9/2008 | Stanforth et al. |
| 2008/0222019 A1 | 9/2008 | Stanforth et al. |
| 2008/0222021 A1 | 9/2008 | Stanforth et al. |
| 2008/0280609 A1* | 11/2008 | Imbimbo et al. ........... 455/435.1 |
| 2009/0028082 A1 | 1/2009 | Wynn et al. |
| 2009/0046625 A1 | 2/2009 | Diener et al. |
| 2009/0093247 A1 | 4/2009 | Srinivasan |
| 2009/0149159 A1* | 6/2009 | Han .......................... 455/414.1 |
| 2009/0197627 A1 | 8/2009 | Kuffner et al. |
| 2010/0023603 A1* | 1/2010 | Archer et al. ................ 709/220 |
| 2010/0063854 A1 | 3/2010 | Purvis et al. |
| 2010/0241720 A1 | 9/2010 | Mazor |
| 2011/0021187 A1 | 1/2011 | Jayapalan et al. |
| 2011/0244839 A1* | 10/2011 | Poltorak .................... 455/414.2 |
| 2011/0306364 A1* | 12/2011 | Gossain et al. ............. 455/456.6 |
| 2012/0192258 A1* | 7/2012 | Spencer et al. ................. 726/7 |
| 2012/0281609 A1* | 11/2012 | Kasslin et al. ............... 370/312 |
| 2012/0302284 A1* | 11/2012 | Rishy-Maharaj et al. . 455/552.1 |
| 2013/0072248 A1* | 3/2013 | Bajko ......................... 455/515 |

OTHER PUBLICATIONS

Kwerel, Evan et al., "A Proposal for a Rapid Transition to Market Allocation of Spectrum", Federal Communications Commission, 2002, OPP Working Paper No. 38, pp. 1-50.

By the Commission, "Second Report and Order, Order on Reconsideration, and Second Further Notice of Proposed Rulemaking", Federal Communications Commission, 2004, FCC 04-167, WT Docket No. 00-230, pp. 1-180.

McKnight, Lee et al., "Best Effort versus Spectrum Markets: Wideband and Wi-Fi versus 3G MVNOs?", pp. 1-18, Presentation at 29th Annual TPRC, Oct. 27-29, 2001.

Prabhu, Krish et al., "Time for Action" Genuine Ideas, 2002, [retrieved online Feb. 1, 2008], <http://www.genuineideas.com/ArticlesIndex/TimeForAction.htm>.

FCC 08-260, Second Report and Order and Memorandum Opinion and Order, Adopted Nov. 4, 2008 and Released Nov. 14, 2008.

"Digital Dividend: Cognitive Access, Consultation on License-Exempting Cognitive Devices using Interleaved Spectrum", Ofcom, Publication Date: Feb. 16, 2009.

U.S. Spectrum Management Policy: Agenda for the Future, 1991.

Radio Spectrum Management, Module 5 of ICT Regulation Toolkit, ITU, 2007.

47 C.F.R. 15.713, dated Feb. 17, 2009, as amended at 75 FR 75840, Dec. 6, 2010.

Jones, Steven K. et al., "Initial Evaluation of the Performance of Prototype TV-Band White Space Devices", (2007), OET Report, FCC/OET 07-TR-1006.

\* cited by examiner

SYSTEM AND METHOD FOR PROVIDING NETWORK ACCESS TO ELECTRONIC DEVICES USING BANDWIDTH PROVISIONING

TECHNICAL FIELD OF THE INVENTION

The technology of the present disclosure relates generally to electronic devices and, more particularly, to a system and method for providing network access to electronic devices using database knowledge of available network resources.

BACKGROUND

Wireless electronic devices, especially those with a high degree of portability while in use, are becoming increasingly popular. But a challenge for these devices is providing reliable network access. Achieving network access can be a particular problem for devices that do not have provisioned access to a default network for the electronic device, such as a nation-wide network deployed by a cellular service provider. Also, even if the device has connectivity access to a default network (sometimes referred to as a "home network"), a secondary network may be preferred in some circumstances. For instance, use of a cellular network for some activities may be more expensive than a WiFi network. As another example, a corporate wireless network may be more secure than an open WiFi access point or a cellular connection. In another example, a WiFi network may offer more available bandwidth than cellular networks unless the WiFi network is operating at or near capacity, in which case the cellular network may offer more useable bandwidth.

SUMMARY

To improve communications capability of portable electronic devices, the present disclosure describes systems and methods of providing network access information, including access credentials, to a wireless device (also referred to as a mobile station or MS) with the assistance of one or more network data servers. A network data server will sometimes be referred to in this document as a database (DB) due to the database services and capabilities of the server. The wireless device acquires information from the servers about available networks at a current location of the wireless device.

These and further features will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the scope of the claims appended hereto.

Detailed Description of Embodiments

Figure 1:
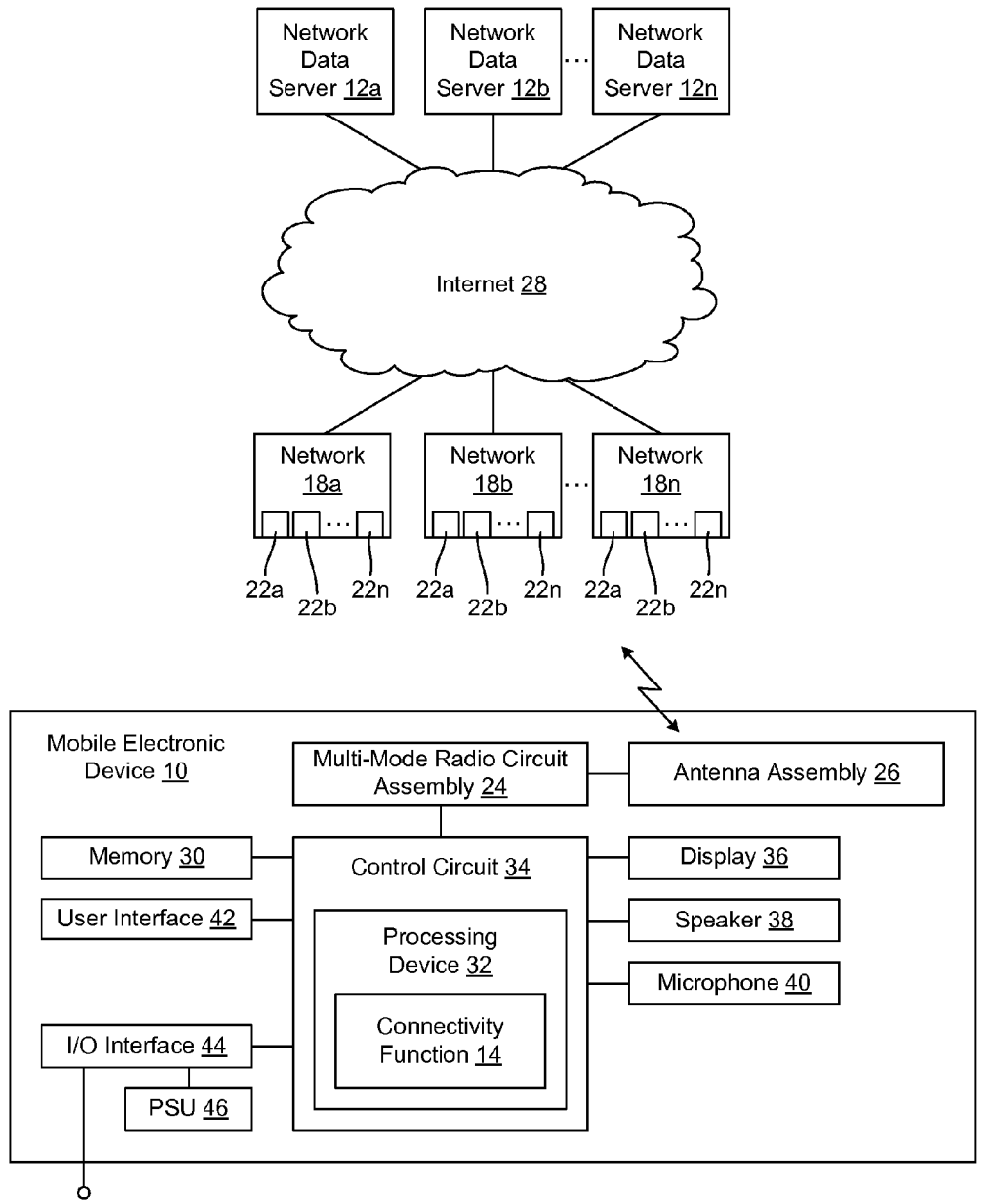
FIG. 1 is a schematic view of a communication system that includes an electronic device and at least one network data sever.

Embodiments will now be described with reference to the drawings, wherein like reference numerals are used to refer to like elements throughout. It will be understood that the figures are not necessarily to scale. Features that are described and/or illustrated with respect to one embodiment may be used in the same way or in a similar way in one or more other embodiments and/or in combination with or instead of the features of the other embodiments.

A. Description of Hardware Embodiment

In the present document, embodiments are described primarily in the context of a portable wireless radio communications device, such as the illustrated mobile electronic device. For purposes of description, the mobile electronic device may be a mobile telephone. It will be appreciated, however, that the exemplary context of a mobile telephone is not the only operational environment in which aspects of the disclosed systems and methods may be used. The disclosed systems and methods may be applied to portable electronic devices and/or to fixed location electronic devices, so long as the device has wireless radio communications capability. Therefore, the techniques described in this document may be applied to any type of appropriate electronic device, examples of which include a mobile telephone, a media player, a gaming device, a computer (e.g., a laptop computer or a tablet computer), a pager, a personal digital assistant (PDA), an electronic book reader, etc. Another exemplary device is an electronics suite that is included in a motor vehicle, such as a passenger entertainment center with one or features that depend on wireless communications. Features that depend on wireless communications may include Internet browsing capability, messaging capability (e.g., email, text messaging, multimedia messaging), video streaming for watching video content, etc.

Figure 2:
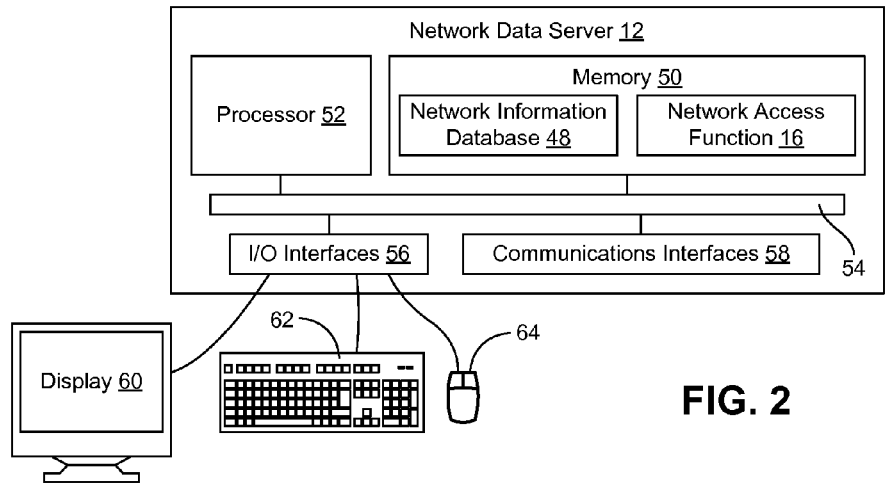
FIG. 2 is a schematic block diagram of an exemplary network data server.

Referring initially to FIG. 1, shown is a system that includes an electronic device 10 and a plurality of network data servers 12, labeled as servers 12a through 12n. The electronic device 10 is portable and has wireless communication capabilities as will be described in greater detail below. The network data servers 12 may be configured as server devices that communicate with the electronic device 10, as will also be described. The electronic device 10 may include a connectivity function 14 and the servers 12 each may include a network access function 16 (FIG. 2). The connectivity function 14 and the network access function 16 may cooperate with each other to assist the electronic device 10 in identifying one or more available networks 18 (labeled as networks 18a through 18n) and establish wireless communications with one of the networks 18 so as to carry out wireless communications with other devices (not shown) through the network 18.

Each of the connectivity function 14 and the network access function 16 may be embodied as executable instructions (e.g., referred to in the art as code, programs, or software) that are respectively resident in and executed by the electronic device 10 and the network access management system 12. The functions 14 and 16 each may be one or more programs that are stored on respective non-transitory computer readable mediums, such as one or more memory devices (e.g., an electronic memory, a magnetic memory, or an optical memory). In the following description, an ordered logical flow for the functionality of the connectivity function 14 and network access function 16 is described. But it will be appreciated that the logical progression may be implemented in an object-oriented or a state-driven manner.

In addition to executable instructions, the server 12 may store a network information database 48 (FIG. 2) in non-transitory computer readable medium (e.g., memory). The database 48 may contain information about the availability and capabilities of one or more the networks 18 by location. Each network 18 may include one or more connectivity devices 22 (labeled as 22a through 22n). The connectivity devices 22 may be, for example, base stations (BS) or access points (AP) as are appropriate for the corresponding network 18.

The electronic device 10 may be configured as a multi-mode device to carry out wireless communications using plural connectivity options, including carrying out communications on different frequencies and with different protocols. For this purpose, the electronic device 10 may include communications circuitry in the form of a multi-mode radio circuit assembly 24 and an antenna assembly 26. The radio circuit assembly 24 and the antenna assembly 26 represent circuitry to communicate over more than one type of communication interface (e.g., communicate with different types of networks 18 as described below). Therefore, the illustrated components represent one or more than one radio transceivers, depending on capabilities of the implementing hardware to tune to multiple frequencies and carry out communications using multiple protocols.

For example, the electronic device 10 may be configured for interaction with a mobile telephone network in the form of a cellular communications network. One or more the networks 18 may be cellular communications network. Exemplary cellular communications networks include, by are not limited to, networks operating in accordance with global system for mobile communications (GSM), wideband code division multiple access (WCDMA), integrated services digital broadcasting (ISDB), high speed packet access (HSPA), or any other appropriate standard or advanced versions of these standards. The cellular communications networks may be compatible with 3G and/or 4G protocols. Therefore, the appended figures may refer to a cellular communication network using 3G and/or 4G designators, but it will be appreciated that such networks are not limited to these protocols. For cellular communication networks the connectivity devices 22 may be communications base stations that are strategically deployed to establish communications between the network 18 and the electronic device 10. The communications base stations are typically in the form of cellular service towers, or "cell" towers. The cellular communications network may further include one or more servers (not shown) for supporting the communications activity of the electronic device 10 and other electronic devices 10, such as managing calls placed by and destined to the electronic device 10, transmitting data to and receiving data from the electronic device 10, and carrying out any other support functions.

The electronic device 10 also may be configured to communicate with other types of networks 18, such as a packet-switched network. Exemplary packet-switched networks include, but are not limited to, a network configured in accordance with IEEE 802.11 (e.g., IEEE 802.11a, IEEE 802.11b, or IEEE 802.11n), each of which are commonly referred to as WiFi. The appended figures may refer to a packet-switched network using the designation 802.11, but it will be appreciated that such networks are not limited to this protocol. Therefore, it will be appreciated that WiFi is not the only alternative network type to cellular communications networks. For example, a network in accordance with IEEE 802.16 (commonly referred to as WiMAX) may be available, or connectivity in accordance with Bluetooth may be available.

It will be appreciated that the electronic device 10 may be capable of communicating using more than one standard and the illustrated radio circuit assembly 24 and antenna assembly 26 represent the hardware and functionality for each desired standard (e.g., there may be one or more than one radio transceiver and/or antenna as part of the electronic device 10). This type of electronic device 10 may be referred to as a multimode mobile station, or MS. For simplicity of the appending figures, the electronic device 10 may sometimes be referred to by the designator MS and the servers may sometimes be referred to by the designator DB.

Each of the networks 18 may allow the electronic device 10 to communicate with the Internet 28. An operative interface also may exist between the servers 12 and the Internet 28. Therefore, regardless of which network 18 to which the electronic device 10 establishes an operative communication link, the electronic device 10 may be able to carry out a full range of communication activities. These activities include, for example, communicating with one or more of the servers 12 or some other device (e.g., another portable electronic device, another server that hosts an Internet website, etc.). Exemplary communications activities of the electronic device 10 include, but are not limited to, calls, data transfers, and the like. Calls may take any suitable form such as, but not limited to, voice calls and video calls. The calls may be carried out over a cellular circuit-switched protocol or may be in the form of a voice over Internet Protocol (VoIP) call. Data transfers may include, but are not limited to, receiving streaming content (e.g., streaming audio, streaming video, etc.), receiving data feeds (e.g., pushed data, podcasts, really simple syndication (RSS) data feeds), downloading and/or uploading data (e.g., image files, video files, audio files, ring tones, Internet content, etc.), receiving or sending messages (e.g., text messages, instant messages, electronic mail messages, multimedia messages), and so forth. This data may be processed by the electronic device 10, including storing the data in a memory 30, executing applications with a processing device 32 to allow user interaction with the data, displaying video and/or image content associated with the data, outputting audio sounds associated with the data, and so forth.

Overall functionality of the electronic device 10 may be controlled by a primary control circuit 34 that includes the processing device 32. The processing device 32 may execute code stored in a memory (not shown) within the control circuit 34 and/or in a separate memory (e.g., the memory 30) in order to carry out operation of the electronic device 10. For instance, the processing device 32 may be used to execute the connectivity function 14. The memory 30 may be, for example, one or more of a buffer, a flash memory, a hard drive, a removable media, a volatile memory, a non-volatile memory, a random access memory (RAM), or other suitable device. In a typical arrangement, the memory 30 may include a non-volatile memory for long term data storage and a volatile memory that functions as system memory for the control circuit 34. The memory 30 may exchange data with the control circuit 34 over a data bus. Accompanying control lines and an address bus between the memory 30 and the control circuit 34 also may be present.

Another component of the electronic device 10 may be a display 36 that is used to display visual information to a user. The electronic device 10 may include a speaker 38 and a microphone 40 to allow the user to carry out voice conversations. A user interface 42, such as a keypad and/or touch screen associated with the display 36, may be present to provide for a variety of user input operations.

The electronic device 10 may further include one or more input/output (I/O) interface(s) 44. The I/O interface(s) 44 may include one or more electrical connectors for connecting the electronic device 10 to another device (e.g., a computer) or an accessory (e.g., a personal handsfree (PHF) device) via a cable, and/or for connecting the electronic device 10 to a power supply. Therefore, operating power may be received over the I/O interface(s) 44 and power to charge a battery of a power supply unit (PSU) 46 within the electronic device 10 may be received over the I/O interface(s) 44. The PSU 46 may supply power to operate the electronic device 10 in the absence of an external power source.

The electronic device 10 also may include various other components. For instance, a camera (not shown) may be present for taking digital pictures and/or movies. Image and/or video files corresponding to the pictures and/or movies may be stored in the memory 30. A position data receiver (not shown), such as a global positioning system (GPS) receiver, may be involved in determining the location of the electronic device 10.

With additional reference to FIG. 2, each server 12 may be implemented as a computer-based system that is capable of executing computer applications (e.g., software programs), including the network access function 16. The network access function 16, and an affiliated network information database 48, may be stored on a non-transitory computer readable medium, such as a memory 50. The memory 50 may be a magnetic, optical or electronic storage device (e.g., hard disk, optical disk, flash memory, etc.), and may comprise several devices, including volatile and non-volatile memory components. Accordingly, the memory 50 may include, for example, random access memory (RAM) for acting as system memory, read-only memory (ROM), hard disks, optical disks (e.g., CDs and DVDs), tapes, flash devices and/or other memory components, plus associated drives, players and/or readers for the memory devices. To execute the network access function 16, the server 12 may include one or more processors 52 used to execute instructions that carry out a specified logic routine(s). The processor 52 and the components of the memory 50 may be coupled using a local interface 54. The local interface 54 may be, for example, a data bus with accompanying control bus, a network, or other subsystem.

The server 12 may have various video and input/output (I/O) interfaces 56 as well as one or more communications interfaces 58. The interfaces 56 may be used to operatively couple the server 12 to various peripherals, such as a display 60, a keyboard 62, a mouse 64, etc. The communications interfaces 58 may include for example, a modem and/or a network interface card. The communications interfaces 58 may enable the server 12 to send and receive data signals, voice signals, video signals, and the like to and from other computing devices via an external network. In particular, the communications interfaces 58 may connect the server 12 to the Internet 28.

Systems and methods of providing network access to the electronic device 10 using the assistance of one or more of the servers 12 now will be described in detail. The techniques may be implemented in a manner that is independent of network subscriptions or service plans of the electronic device 10, independent of predetermined or current network association of the electronic device 10, and independent of current radio technology used for wireless communications.

Therefore, aspects of the described techniques may be employed with electronic devices that have no innate or previously provisioned network affiliation, and/or with electronic devices that have no pre-programmed or previously stored network access credentials for one or more networks. An electronic device of this nature is sometimes referred to as a "disconnected device" or an "edge device" due to its network independence and/or inability to conduct wireless communications without obtaining network access credentials.

B. Determination of Network Candidate List and Network Selection

The electronic device 10 may query the server 12 for information about available network options and, in turn, the server 12 may return a list of networks 18 that match communication parameters, capabilities and/or preferences of the electronic device 10, and that may service the electronic device 10 under any applicable government or regulatory agency rules. The returned information may include identity and/or connectivity information about connectivity devices 22 of the matching networks 18 that are within communication range of the electronic device 10. The electronic device 10 may query more than one of the servers 12 for available network options to gather neighborhood network information from plural sources that offer different or overlapping services. In one embodiment, the electronic device 10 uses the returned information to determine which network 18 to connect with in order to carry out wireless communications. The determination may include selection of a specific connectivity device 22.

In one embodiment, the electronic device 10 may communicate with a proxy server to request information regarding available network options. The proxy server may be one of the servers 12. The proxy server may collect information from multiple servers 12 or other services on behalf of the electronic device and return the collected information to the electronic device 10 in a consolidated manner. Also, the proxy server may analyze the collected information to narrow the results to the most suitable network options for the electronic device 10.

In addition to providing available network option information, the server 12 may provide the electronic device 10 with information that is used by the electronic device 10 to determine when to re-query the server for available network options. This information may be in the form of an amount of time or in the form of a distance from a current location of the electronic device 10. In one embodiment, the techniques do not include an active information exchange between the networks 18 (or the connectivity devices 22 of the networks 18) and the server 12 for the server 12 to generate the information that is provided to the electronic device 10. Rather, the database 48 may contain sufficient information to generate the information.

It is noted that IEEE 802.21 includes techniques to collect a list of available networks at a location of a wireless device from an information server. But IEEE 802.21 has several limitations addressed by the techniques described in this document. For instance, IEEE 802.21 does not account for several device capabilities and characteristics when creating a neighborhood network list for a device. One of the prominent device characteristics not addressed by IEEE 802.21 is power save features in radio devices. In addition, IEEE 802.21 services are network centric in that the services relate to one network or one type of network, and the network is aware of the presence of the electronic device for which the service is provided. In contrast, the server(s) 12 may be unassociated with the networks 18, and offer services to electronic devices that may be unassociated with and without an access link with the networks 18. Therefore, the electronic device 10 need not be provisioned to natively operate with any of the networks 18. Also, the servers 12 may be independent of the networks 18 and may offer the electronic device 10 information regarding different classes (e.g., types) of networks 18.

Prior to associating with one of the networks 18, the electronic device 10 may communicate with one or more of the servers 12 through any available communication pathway, which may include use of one of the networks 18 for the limited purpose of establishing communication with the server(s) 12.

The electronic device 10 may register with one or more servers 12. The registration may include transmitting a device capabilities and network preferences to the server(s) 12 in the form of a registration request. The registration request may include one or more of the following information elements:

Device Parameter
    Current location in a format compatible with the server
    Type of location tracking supported by the electronic device
        e.g. GPS, Assisted GPS (A-GPS), Skyhook
    Speed and direction of movement, if applicable
    Electronic device decision making capability
        Based on processing power or features available in the electronic device
Each radio protocol or interface standard supported by the electronic device
    802.11, WiMax, GPS, WCDMA, etc.
Parameters for each radio protocol or interface standard supported by the electronic device
    EIRP
        Dependent on electronic device mode of operation
    Security
        WPA, WPA2, etc.
    Band(s) of operation
        VHF, UHF, ISM, . . .
    Bandwidth support
        5 MHz, 10 MHz, . . .
    Support channel bonding
        Primary channel, Secondary channel(s)
    Power Save
        802.11 (e.g. PSMP)
    Preferred communication device 22 or network 14
        A specific network service provider (e.g., a specified company's network)
        A specific connection device 22 or a specific network 18
    Mode of operation (if multiple modes supported, as in white space)
        VHF, UHF Personal/Portable device: Mode I
    List of sensed connectivity devices 22 in the neighborhood of the electronic device, which may include link information
    Resource (e.g. bandwidth) requirement or preference
        e.g. 2 Mbps (average)
    Subscription info
        A specific network service provider (e.g., a specified company)
    Network Preference
        Cost
        Throughput
        Distance
        Preferred connectivity device(s) or network
        Power save or power consumption
        Security
    Current network association
        3G/4G, network service provider, SSID
    User driven or electronic device driven connectivity decision making or server driven connectivity decision making for roaming In response to the registration request, the server 12 responds with a registration reply. The registration reply may indicate whether the registration was successful or failed. After a successful initial registration, the electronic device 10 may periodically update its registration information with the server 12 to keep a corresponding entry in the information stored by the server 12 in an active state. The periodic update may include updating any dynamic elements of the registration request that may have changed value since the initial registration or the last update.

After a successful initial registration, the electronic device 10 also may request information regarding available network resources to which the electronic device 10 may connect for the current location of the electronic device 10, which is referred to as neighborhood network for the electronic device 10. The information may be requested by transmitting a network information request to the server 12 to commence a network information exchange. In reply, the server 12 may return a connectivity device 22 candidate list to the electronic device 10. The connectivity device 22 candidate list may be in the form of connection information for specific connectivity devices 22. Alternatively, the returned candidate list may, more generally, include connectivity information for networks.

The request from the electronic device 10 for a list of available network resources for the current location of the electronic device 10 may be based on the plurality of parameters and operating preferences identified in the registration request and in the network information request. The network information request may include any dynamic elements of the registration request that may have changed value since the initial registration or the last registration update. In addition, the network information request may include one or more preference elements that are used by the server 12 to identify available network options in the vicinity of the electronic device 10. Exemplary elements included in the network information request include:

Operating parameters for each radio or network protocol supported by the electronic device;
Network preference in terms of a preference for a specific network (e.g., a network operated by a preferred network service provider) and/or a preference for a type of network;
Preferences for power consumption or savings, communication range, cost (e.g., financial charges for network use), and/or throughput;
Preferences for whether decisions regarding which connectivity device 22 to use are made at the electronic device 10 or at the server 12;
Information regarding device parameters and supported radio features;
A current location of the electronic device 10; and
Decision making capability of the electronic device 10 in terms of computing power and software resident on the electronic device 10 for execution.

After receiving a network information request from the electronic device 10, the server 12 may use the location of the electronic device 10 to identify the neighborhood network for the electronic device 10. For instances, connectivity devices 22 that are in the neighborhood network may be determined using EIRP of the electronic device 10 and the EIRP of connectivity devices 22 that are known from the database 48 to be in potential communication range of the electronic device 10. In addition, a terrain model and/or a path propagation model may be used to determine the networks 18 and connectivity devices 22 in the neighborhood network of the electronic device 10.

Initially, the server 12 may create a preliminary connectivity device 22 candidate list that includes the connectivity devices 22 that are in connectivity range of the electronic device 10 and that are operationally compatible with the electronic device 10. For instance, the preliminary candidate list may include connectivity devices 22 that satisfy operational requirements of the electronic device as identified during the registration process. As such, the connectivity devices 22 in the candidate list are compatible with the radio technologies supported by the electronic device 10, operate in the bands supported by the electronic device 10, and account for mode of operation of the electronic device 10 (mode of operation may be most relevant for white space channels). In addition, the connectivity devices 22 in the candidate list may support electronic device 10 security parameters, power save preferences, and any other operational criteria to support basic communication between the electronic device 10 and the connectivity device 22.

After establishing the preliminary candidate list, the list of connectivity devices 22 may be further reduced based on preferences of the electronic device 10 as determined during the registration process and/or from the network information request. The results after applying the preferences of the electronic device 10 may be referred to as a secondary candidate list. The secondary candidate list may include any number ("n") of connectivity devices 10 that may be suitable for the electronic device 10. This list of connectivity devices 10 may be transmitted to the electronic device 10 for further decision making in terms of which connectivity device 22, and hence which network 18, to use for wireless communications. In one embodiment, before transmission to the electronic device 10, the secondary candidate list may be further shortened and/or ranked based on one or more parameters, such as one or more of: distance between connectivity device 22 and electronic device 10; expected throughput; cost to the user of the electronic device 10; preferred connectivity device 22 or network 18; quality of service; and power save criteria.

Figure 3:
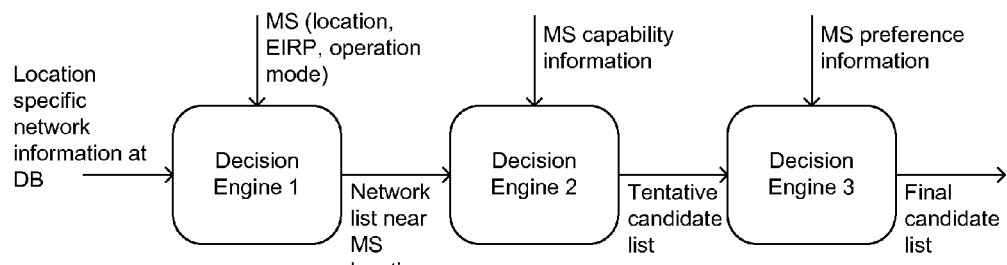
FIG. 3 is an exemplary process flow carried out by the network data server.

In one embodiment, the reply to the network information request may be in the form of a network information response that is transmitted from the network 12 to the requesting electronic device 10. In one embodiment, the network information response (e.g., candidate list) may include the following information, where (i) represents an incremented variable for each network 18 being identified in the response, (j) represents an incremented variable for each connectivity device 22 being identified for a corresponding one of the identified networks 18, and (k) represents an incremented variable for each radio communication option (e.g., operational channel) for each connectivity device 22 being identified in the response:

Network ID (i)
    Connectivity Device ID (j)
        Radio connectivity option (k)
            Association parameters
                Channel of operation (primary channel if bonding is used)
                Bandwidth of operation (list of channels if bonding is used)
                Technology used (e.g., WiMax, WiFi, etc.)
            Expected throughput.
                Min(wireless link, backhaul link)
        Match to one or more electronic device preferences
            Distance to electronic device
            Power save support
            Cost
            Quality of service
            Etc.
    Next request threshold
        Distance from current location in which to send a new network information request
        Time at which to send a new network information request With additional reference to FIG. 3, illustrated are logical steps carried out by the server 12 to process a network information request for the electronic device 10 using the capability, preference and location information for the electronic device 10. As an alternative to generating and transmitting a list of candidate connectivity devices 22, the server 12 may select one connectivity device 22 (or, more generally, one network 18) and transmit connection information for the selected connectivity device 22 to the electronic device 10. This alternative may be used when the electronic device 10 is not capable or not configured to determine which connectivity device 22 to use from a list a candidate connectivity devices 22, or when a determination has been made to have the server 12 make the connectivity device 22 selection on behalf of the electronic device 10 (e.g., to assist in roaming of the electronic device 10).

In addition to providing connectivity information for one or more connectivity devices 10, the server 12 may transmit information to the electronic device 10 that is used by the electronic device 10 to determine when to transmit another network information request to the server 12. This information may be in the form of a next request threshold in the form of a distance value (e.g., 50 feet, 200 feet, a half mile, a mile, etc.) and/or a time value (e.g., 10 minutes, 30 minutes, an hour, etc.). If the electronic device 10 travels from its current location an amount equaling a distance from the distance value, the electronic device 10 may transmit a new network information request to the server 12. Similarly, if an amount of time equaling the time value elapses, the electronic device 10 may transmit a new network information request to the server 12.

The time or distance next request threshold may be selected by the server 12 to assist the electronic device either stay connected to a favorable network 18 (e.g., a network that meets or exceeds electronic device 10 preferences for throughput, cost, power consumption, quality of service, or other criteria) or find a new network 18 if the current network 18 is not favorable in terms of electronic device 10 preferences for throughput, cost, power consumption, quality of service, or other criteria. If connected to a favorable network 18 or the electronic device 10 is not travelling or traveling relatively slowly for the communication range of the current connectivity device 22, then the distance for re-requesting connectivity information may be relatively far. If connected to an unfavorable network 18 or the electronic device 10 is travelling relatively quickly for the communication range of the current connectivity device 22, then the distance for re-requesting connectivity information may be relatively short. Similarly, if connected to a favorable network 18 or the electronic device 10 is not travelling or traveling relatively slowly for the communication range of the current connectivity device 22, then the amount of time for re-requesting connectivity information may be relatively long. If connected to an unfavorable network 18 or the electronic device 10 is travelling relatively quickly for the communication range of the current connectivity device 22, then the amount of time for re-requesting connectivity information may be relatively short.

The time or distance next request threshold may be further selected by the server 12 to assist the electronic device 10 maintain its ability to carry out wireless communications, especially when travelling and there is a possibility is travelling outside the communication range of the current connectivity device 22 or network 18. For this purpose, the time and distance may be based, at least in part, on the speed and/or direction of travel of the electronic device 10.

The distance or time next request threshold may be determined by the sever based on information that is maintained by the server 12 about the capabilities and preferences of the electronic device 10 and about the networks 18, including the constituent connectivity devices 22 of the networks 18. As an example, based on the information maintained by the server 12 and predicted movement of the electronic device 10, the server 12 may determined that the electronic device 10 may be able to communicate with a different, more favorable network 18 if the electronic device 10 moves a certain distance in a certain range of directions.

Figure 4:
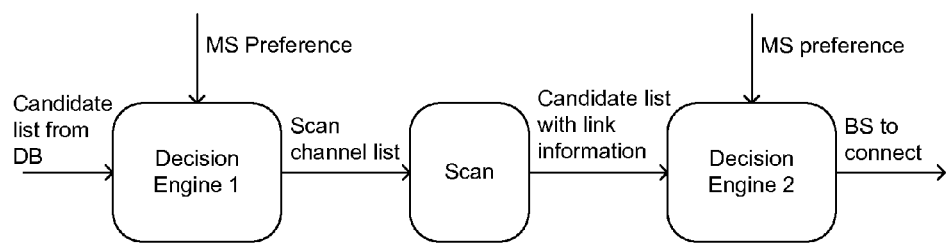
FIG. 4 is an exemplary process flow carried out by the electronic device.

With additional reference to FIG. 4, illustrated are logical steps carried out by the electronic device 10 to process a network information response and select a communication device 22 for wireless communications. When the electronic device 10 receives the candidate list from the server 12, the electronic device 10 may use its preferences to further shorten the list of candidate connectivity devices 22. In one embodiment, the preferences used in this step may be preferences that are not shared with the server 12. Rather, these preferences may be useful as part of an analysis of actual link information with the connectivity devices 22.

The electronic device 10 may scan a channel occupied by each of the candidate connectivity devices 22 from the shortened list to quantify the quality of the link to each connectivity device 22. Then, the electronic device 10 may employ a decision engine to select one of the connectivity devices 22. Thereafter, the electronic device 10 may associate with the selected connectivity device 22 (e.g., by using appropriate handshaking for the selected communication device 22) and carry out wireless communications.

Figure 5:
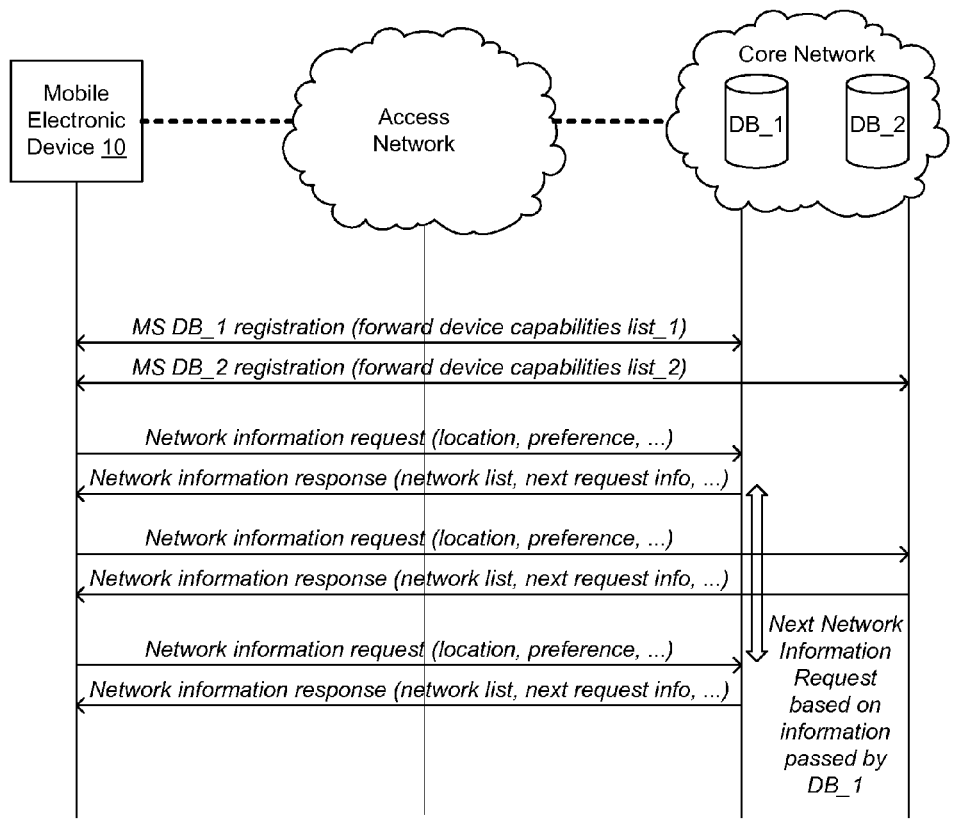
FIG. 5 is an exemplary call flow between the electronic device and one or more network data servers.

With additional reference to FIG. 5, illustrated is an exemplary call flow between the electronic device 10 and two servers 12 to carry out the above-described functions.

Depending on security preferences of the electronic device 10 and/or configuration of the network 18 with which the electronic device 10 may associate, security credentials to establish secured connection between the network 18 and the electronic device 10 may be obtained by the electronic device 10. In one embodiment, the security credentials may be supplied to the electronic device from the server 12. The security credentials may be take any appropriate form including, for example, a certificate, a username and password, a phase-shifting key (PSK) passphrase, a key (e.g., public key, shared key or private key), or similar data item or items.

In one embodiment, following registration of the electronic device 10 with the server 12, the connectivity function 14 running in the electronic device and the network access function 16 running in the server 12 may establish a secure tunnel for further communications between the electronic device 10 and the server 12. The tunnel may be created in an application layer and may be transparent to an underlying physical layer link. Once the secure tunnel is in place, the electronic device 10 may receive security credentials for one or more networks 18, or one or more specific connectivity devices 22, from the server 12 using the tunnel. The obtained security credentials are not exposed to the user of the electronic device 10. The application layer in the electronic device 10 may apply the security credentials below, but not above, the application layer in the protocol stack.

In one embodiment, the server 12 may maintain security credentials of networks 18 in a given geographic area. Alternatively, the sever 10 may obtain security credentials from one or more networks 18 on behalf of an electronic device 12. In situations where the sever 12 is not aware of the security credentials for one of the networks 18, or a specific connectivity device 22, the server 12 may set the security credentials to "unknown". The "unknown" security credential setting also may be used for networks 18 or connectivity devices 22 that use authentication above the application layer.

In one embodiment, the security credentials for a selected network 18 or connectivity device 22 are obtained by transmitting a roaming commit request to the server 12. Depending on a preference setting of the electronic device 10 or the credentials to be supplied, the sever 12 may return the credentials of a given connectivity device 22 or an entire network 18 in a roaming commit response. In the case of transmission of security credentials for a connectivity device 22, and if the security credentials are not the same across the corresponding network 18, then the server 12 may returns a list of security credentials for plural connectivity devices 22 belonging to the network 18. The server 12 also may return security credentials for multiple networks 18 serving the location of the electronic device 10.

Figure 6:
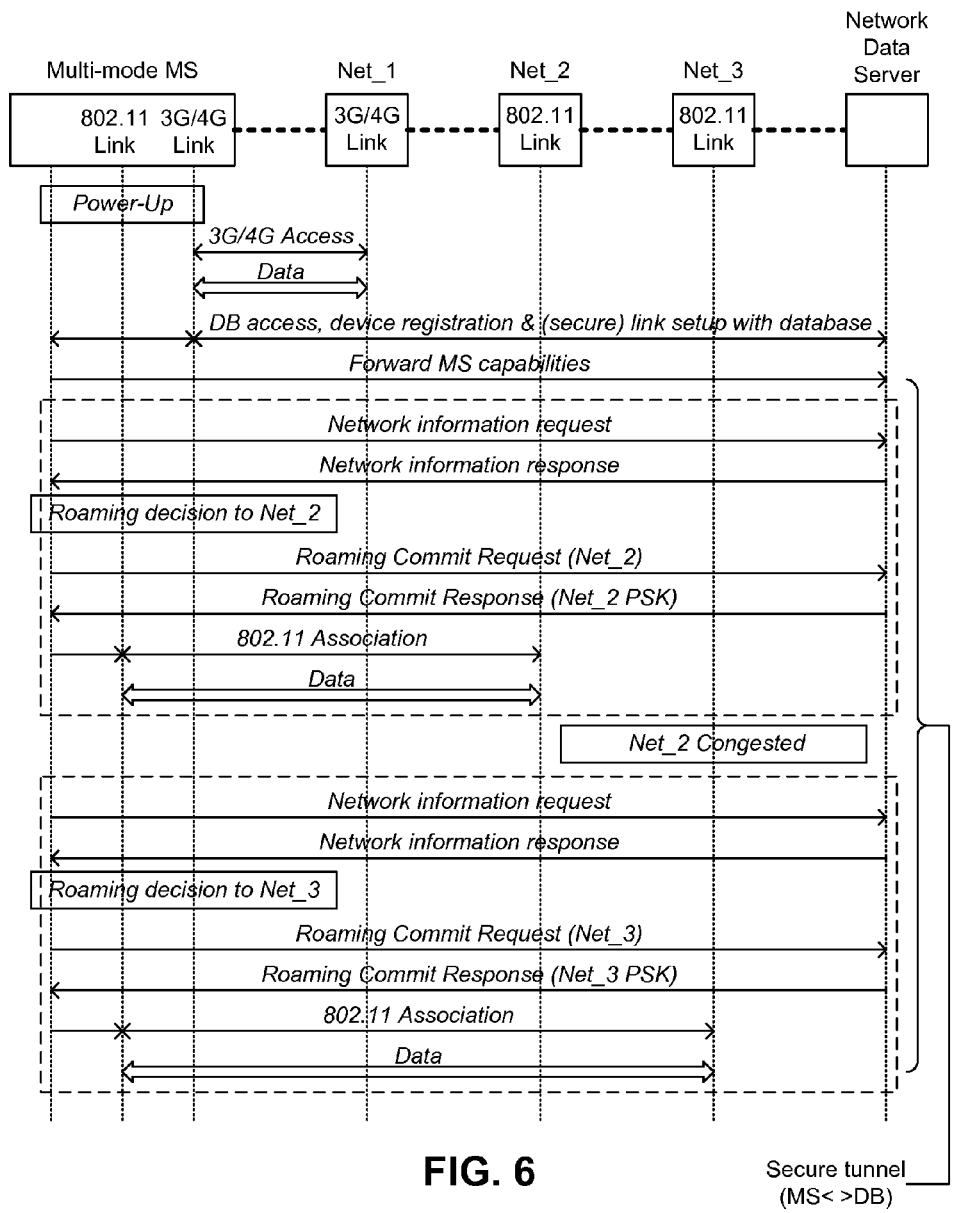
FIG. 6 is an exemplary call flow for the establishment of secure communications between the electronic device and a network.
Figure 7:
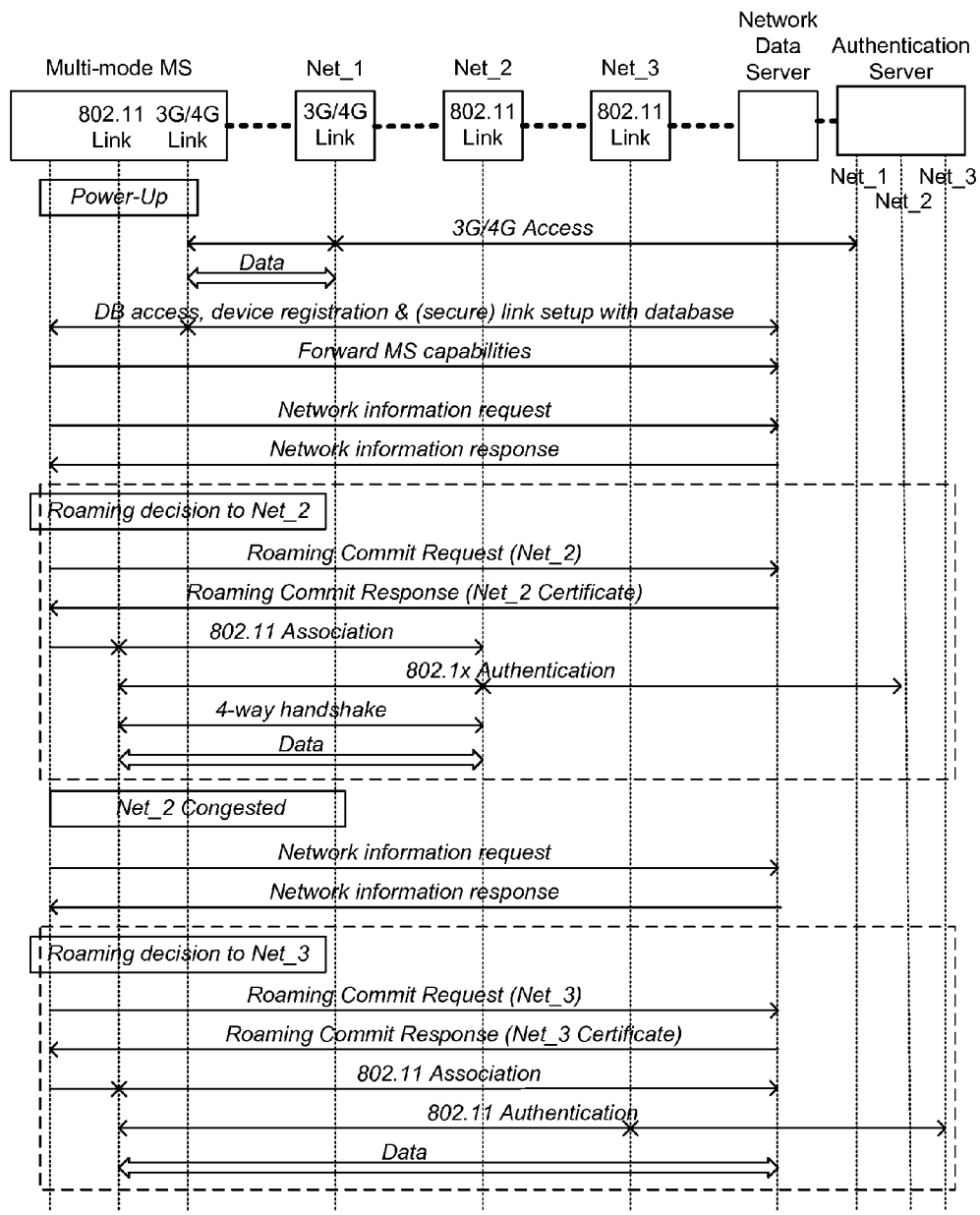
FIG. 7 is another exemplary call flow for the establishment of secure communications between the electronic device and a network.

FIG. 6 illustrates an exemplary call flow for obtaining security credentials for PSK based network access and FIG. 7 illustrates an exemplary call flow for obtaining security credentials for certificate based network access. In both of these exemplary flows, one network (Net_2) is found to be congested and the electronic device seeks access to another network (Net_3).

In one embodiment, the roaming commit request to obtain security credentials may be sent after the network information exchange with the server 12 and determination of which connectivity device 22 to use has been made. Alternately, the electronic device 10 may proactively send a roaming commit request based on a prior network information exchange with the server 12 and where the electronic device 10 has knowledge of a preferred connectivity device 22 in a known location.

C. Wireless Bandwidth Provisioning-Connectivity Support for "Disconnected Devices"

Figure 8:
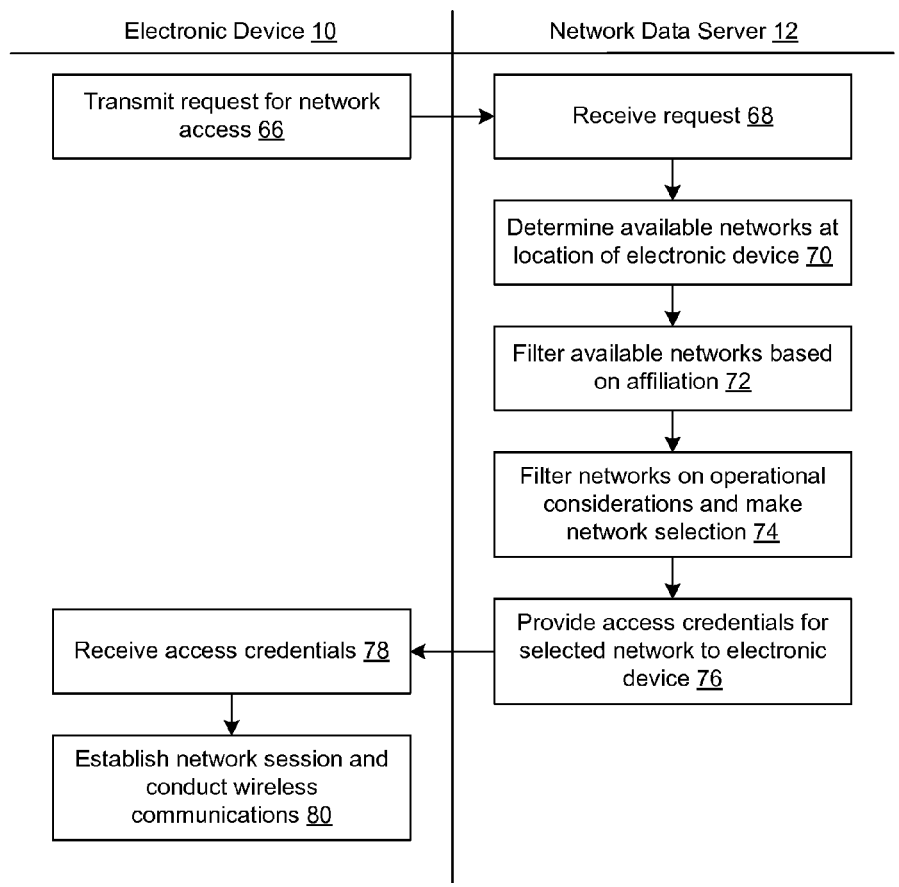
FIG. 8 is a flow diagram of functions carried out by the electronic device and functions carried out by one of the network data servers to establish wireless communications capabilities for the electronic device.

With additional reference to FIG. 8 illustrated is a flow diagram of functions carried out by the electronic device 10 (e.g., functions embodied in the connectivity function 14) and counterpart functions carried out by one of the network data servers 12 (e.g., functions embodied in the network access function 16) to establish wireless communications capabilities for the electronic device 10. The flow diagram may be considered to represent steps of a method carried by the electronic device 10 and a corresponding method carried out by the server 12. The order of the functional blocks of the illustrated embodiment may be altered and/or some blocks may be carried out concurrently. Additionally, some blocks may be omitted.

The logical flow allows a disconnected device to attain network access to carry out wireless communications. A disconnected device is a device having no inherent, innate, preprogrammed or pre-provisioned access credentials to establish communication sessions with a network. In some situations, the disconnected device also may be referred to as a "contractless" device if there is no agreement with a service provider to provide wireless communication service for the device. Due to the network independence of the electronic device, the electronic device seeks network access credentials each time the electronic device is without a current network session and commences a logical operation that relies on wireless communications. In other situations, the device may be capable of using a pre-determined network (e.g., a cellular network), but may seek the ability to use an alternative network for wireless communications. The types of wireless communications carried out by the electronic device 10 using the obtained network access may include, but are not limited to, Internet browsing, data communications, video or audio streaming, messaging, VoIP calls, etc.

The server 12 arranges network access to one of the networks 18 for the electronic device 10. The arranged network access uses the existing physical resources of the network 18 and uses existing spectrum resources of the network 18. The existing physical resources may include, for example, a wireless access point or a base station (e.g., one or more of the connectivity devices 22). The spectrum resources of the network 18 may be licensed or unlicensed spectrum for which the network 18 has attained use rights for the purpose of servicing client devices. In some situations, the network 18 may attain the use rights in spectrum from the server 12 or other spectrum allocation source.

The establishment of network access for the electronic device 10 in this context may be considered bandwidth provisioning in which the server 12 negotiates or brokers the right of the electronic device 10 to temporarily or permanently use network services of the network 18 so as to engage in wireless communications.

The logical operations may be employed in a variety of contexts. In one embodiment, a source entity (e.g., a vendor) of the electronic device 10 may sell or supply the electronic device 10 to another entity (e.g., a customer, an employee, etc.). An example of this embodiment is a car manufacturer that sells cars equipped with the electronic device 10. Another example of this embodiment is a retailer that sells or gives out the electronic device 10 and also sells or makes available content (e.g., electronic books, movies, television shows, and/or music). Another example of this embodiment is a business that supplies the electronic device 10 to its employees. In these embodiments, the entity selling or providing the electronic device 10 desires that the electronic device 10 has communications capability and may arrange for the server 12 to attend to facilitating network access. In another embodiment, a user has purchased or obtained the electronic device and, desiring communications capability, has arranged for the server 12 to attend to facilitating network access. Arranging for the server 12 to attend to facilitating network access may involve subscribing to a service offered by the operator of the server 12, registering with the server 12, paying a fee, and/or some other act. In turn, the operator of the server 12 may arrange with the various operators of the networks 18 so that server 12 may provide access credentials to the electronic devices 10 so that the electronic devices 10 may access one of the networks 18 and utilize the communications capabilities of the network 18. Any business agreements between or among the operator of the server 12, the operators of the networks 18, the source entity of the electronic device 10, and the user of the electronic device 10 are not germane to the systems and methods set forth in this disclosure.

The logical flow may begin in block 66. In block 66, the electronic device 10 transmits a request for network access to the server 12. The request contains data used by the server 12 to supply appropriate network access credentials to the electronic device 10. This data may include an identity of the electronic device 10 and the location of the electronic device 10. In one embodiment, the data also includes networks 18 that are detected by the electronic device 10. Other information that may be contained in the request or that may have been previously supplied to the server 12 includes, but is not limited to, communication protocols and frequency bands supported by the electronic device 10, affiliations of the user of the electronic device 10, and so forth. An affiliation of the user of the electronic device 10 may be information about the user that would entitle the electronic device 10 (as belonging to the user) to use the communications capabilities of one or more of the networks 18. These affiliations may be, but are not limited to, membership in a club, an organization, or a rewards program; subscription to a service; purchase of an item; employment by an employer; enrollment at a school or university; acquisition of the electronic device 10 from an authorized entity (e.g., a vendor of the electronic device 10); etc.

In block 68, the server 12 receives and begins to process the request for network access. In block 70, the server 12 may determine each network 18 that is available for use by the electronic device 10 in the present location of the electronic device 10. Networks 18 that are available for use by the electronic device 10 include those networks 18 that operate on a channel and with a protocol supported by the electronic device 10.

In one embodiment, the available networks 18 are further refined by filtering the available networks based on affiliations that would entitle the electronic device 10 to establish wireless communications using the network services of the networks 18. The filtering is performed in block 72. The affiliations may be pre-established use authorizations or permissions to use the network 18, affiliations of the user of the electronic device 10 as described above, affiliations between the server 12 and the network 18, or affiliations between the source entity of the electronic device 10 and the server 12 or the network 18. An affiliation between the server 12 and the network 18 may be an agreement between the operator of the server 12 and the operator of the network 18 to allow the server 12 to provide the requesting electronic device 10 with access credentials to the network 18. Affiliations between the operator of the server 12 and the operator of the network 18 may be established so that the server 12 has the capability to make network access available to the electronic device 10 and/or so that the operator of the network 18 obtains users for the network services of the network 18. Similarly, an affiliation between the source entity of the electronic device 10 and the network 18 may be an agreement between the source entity and the operator of the network 18 to allow the server 12 to provide the requesting electronic device 10 with access credentials to the network 18. Affiliations between the source entity of the electronic device 10 and the operator of the network 18 may be established to ensure that the electronic device 10, once provided to the user, has the capability to engage in wireless communications and/or so that the operator of the network 18 obtains users for the network services of the network 18.

In block 74, the server 12 may filter the networks 18 surviving the filtering of block 72 using operational considerations and may determine a single network 18 for which access credentials will be supplied to the electronic device 10. Filtering on operational considerations may account for one or more factors including, but not limited to, load balancing among the networks 18; predicted performance of the networks 18 in satisfying minimum quality of service or throughput specified by the electronic device 10; type of wireless communications in which the electronic device 10 engages; channel width (bandwidth) and/or throughput capacity provided by the networks 18; coverage area of the networks 18; cost of using the networks 18 to one or more of the user of the electronic device 10, the operator of the server 12, or the source entity of the electronic device 10; security features provided by the network; etc. The network 18 that supplies the most favorable combination of operational considerations for the electronic device 10 may be selected by the server 12.

To assist in the determination of block 74, the server 12 may maintain performance statistics for the available third party networks 18 to improve bandwidth provisioning decisions. In one embodiment, each network 18 or the constituent connectivity devices 22 transmits performance statistics for the connectivity devices 22 to the server 12 on a periodic basis. The performance statistics for each connectivity devices 22 may include one or more metrics such as, but not limited to traffic load, number and/or identity of currently associated client devices, packet loss ratio, packet delay time, etc. In addition to performance reports from the networks 18 or connectivity devices 22, the electronic device 10 may supply reports regarding performance for current or past network sessions. The performance-related metrics received from each source may be time averaged by the server 12 and the time average results may be used by the server 12 to rate the predicted performance of each network 18 and each connectivity device 22. In one approach, the server 12 may establish performance ratings for the connectivity devices 22 based on the supplied metrics. The ratings may be adjusted over time and may be used as part of the filtering process of block 74.

In block 76, the server 12 transmits access credentials for the selected network 18 to the electronic device 10. In one embodiment, the access credentials are required to establish a network session with the network 18. The access credentials may include, but are not limited, one or more of network name or identifier of the selected network 18 (or name or identifier of specific connectivity device 22 within the network 18), a username and password, a certificate, a phase-shifting key (PSK) passphrase, a key (e.g., public key, shared key or private key), or other authentication data. The access credentials may be valid for a limited period of time. The access credentials are received by the electronic device 10 in block 78. In block 78, the electronic device 10 establishes a network session with the network 18 for which the access credentials were received and conducts wireless communications.

An advantage of the operations described in this section is that the user of the electronic device 10 and/or the electronic device 10 itself need not have prior knowledge of the network 18 identified by the server 12 or the access credentials for the network 18. The operations to achieve communications capability from requesting network access to establishment of the network session may be transparent to the user of the electronic device 10. The user may not be aware that the process has occurred. The user also may not be aware of the mechanism by which communications capability is established or aware of the identity of the network 18 through which wireless communications are carried out. Additionally, the user may not be made aware of the access credentials that are supplied to the electronic device 10 and may not have a mechanism to ascertain the access credentials. For instance, the electronic device 10 may not store the access credentials after termination of the network session and, during retention of the access credentials, the access credentials may be stored in an encrypted form.

The operations described in this section allow a source entity to provide users with electronic devices 10 and provide for a mechanism for the electronic devices 10 to engage in wireless communications in a manner that does not involve deploying physical network resources. Rather, wireless communications are established using existing network assets of networks 18 belonging to third parties. The networks deployed by the third parties may be wide-spread networks (e.g., cellular networks deployed by commercial cellular telephone carriers) or networks having more limited coverage (e.g., a network deployed by a store, coffee-house, university, municipality, private individual, etc.). As mention, however, the operations may be used in other contexts, such as providing a virtual cellular network service for subscriber devices without deploying physical network resources. In this exemplary case, a provider seeks bandwidth provisioning from the server 12 to gain network credentials for one or more networks 18 and the provider re-allocates the network credentials to client devices that subscribe with the provider. Furthermore, in this embodiment, a server of the provider that communicates with the server 12 may be considered the electronic device 10.

The operations to provide the electronic device with access to the network 18 may be transparent from the view-point of the electronic device 10 and the network 18. In one embodiment, the server 12 assumes responsibility for ensuring that the electronic device 10 is validated to use the network 10. This responsibility involves a bi-directional security implication. More specifically, the operations of the server 12 may include validating the network 18 to ensure that the electronic device 10 is provided with access credentials to legitimate networks 18 (e.g., networks that are known to be secure) and, conversely, validating the electronic device 18 to ensure that any electronic devices 10 that are provided with access credentials to the network 18 are entitled to have access the network 18.

D. Wireless Bandwidth Provisioning-Service Thresholds

In one embodiment, it is possible to provide a minimum level of quality of service to the electronic device 10 through the bandwidth provisioning described in the preceding section. Providing a minimum level of quality of service ensures that operational requirements of the electronic device 10 in terms of data throughput are met. In the case where a provider contacts the server 12 to gain access to another party's network 18 for the offering of network services to subscribing client devices, the minimum level of quality of service can ensure that the provider obtains sufficient capacity to be able to service the provider's client devices.

For purposes of this disclosure, minimum level of quality of service through bandwidth provisioning is measured in terms of data unit per unit time (also referred to as a minimum data rate). The data units may be, for example, kilobits (Kb), megabits (Mb), gigabits (Gb) or terabits (Tb). The time units may be, for example, seconds, minutes, hours, or days. Therefore, exemplary minimum level of quality of service could be 3 Mb per second (Mbps) or 1 Gb per minute. Due to transient fluctuations in network performance, it is possible that the network 18 may not be able to deliver the specified minimum level of quality of service for every data unit, especially when the time units are seconds. Therefore, time units of a minute or longer may be preferred and/or the data rate may be considered an average data rate over a period of time longer than the data unit.

Typically, the minimum level of quality of service is available to the electronic device 10 (or provider) for the duration of the time that the network access is made available. Hence, there is no limit on the aggregate amount of data use by the electronic device over any time period. In another embodiment, the server 12 and/or network 18 may place a limit on the aggregate data use by the electronic device 10 or apply charges if aggregate data use exceeds a predetermined amount.

The bandwidth of the network 18 that satisfies the minimum level of quality of service may be a portion of the overall capability of the network 18 to support wireless communications. For instance, the network 18 may offer services to devices that subscribe directly with the network 18 and plural devices that gain access through the server 12. In this case, the overall capacity of the network 18 is shared among these devices. The minimum level of quality of service for any one electronic device 10 gaining access through the server 12 may be a percentage of the overall capacity of the network 18. In another embodiment, the minimum level of quality of service for any one electronic device 10 gaining access through the server 12 may be achieved using one or more channels that are not used by devices subscribing directly with the network 18.

Should the quality of service of the network 18 degrade such that the network cannot deliver the minimum quality of service to the electronic device 10, then the electronic device 10 may switch to another connectivity point 22 of the network 18 delivering the current service or switch to another network 18. In one embodiment, the degradation may be determined by the electronic device 10 and the switch may be initiated by transmitting a new request for network access (block 66 of FIG. 8) to the server 12. In another embodiment, the degradation may be determined by the server 12 using performance reports received from one or more of the electronic device 10, the connectivity device 22, or the network 18. In this case, the server 12 may initiate steps to identify a new connectivity device 22 for the electronic device 10 to improve the quality of service.

In one embodiment, it is possible to limit the impact of bandwidth provisioning on a network 18 for which access credentials are made available to the electronic device 10 through the server. For instance, as part of the bandwidth provisioning, a maximum level of quality of service for the electronic device 10 may be specified. Similar to the minimum level of quality of service, the maximum level of quality of service is measured in terms of data unit per unit time (also referred to as a maximum data rate). The data units may be, for example, kilobits (Kb), megabits (Mb), gigabits (Gb) or terabits (Tb). The time units may be, for example, seconds, minutes, hours, or days. Therefore, exemplary maximum level of quality of service could be 25 Mbps or 16 Gb per minute. Also, time units of a minute or longer may be preferred and/or the data rate may be considered an average data rate over a period of time longer than the data unit. Additionally, it will be observed that the maximum data rate is not a limit on aggregate data use, except in the limited instance of the electronic device 10 exchanging data at the maximum data rate for the entire period of time during which the electronic device 10 has the ability to access the network 18.

The bandwidth of the network 18 that satisfies the maximum level of quality of service may be a portion of the overall capability of the network 18 to provide wireless communications capabilities.

In one embodiment, the maximum data rate and/or the minimum data rate are specified for total data directed to and transmitted by the electronic device 10. In another embodiment, a minimum data rate may be specified for an uplink between the network 18 and the electronic device 10, a minimum data rate may be specified for a downlink between the network 18 and the electronic device 10, a maximum data rate may be specified for the uplink between the network 18 and the electronic device 10, and a maximum data rate may be specified for the downlink between the network 18 and the electronic device 10.

E. Conclusion

Although certain embodiments have been shown and described, it is understood that equivalents and modifications falling within the scope of the appended claims will occur to others who are skilled in the art upon the reading and understanding of this specification.

What is claimed is:

1. A network data server that establishes network access for an electronic device to enable the electronic device to engage in wireless communications, comprising:
 a communication interface over which the network data server receives a request for network access from the electronic device, the electronic device not pre-programmed or pre-provisioned with access credentials to establish communications sessions with a network and has no agreement with a service provider to provide wireless communication service to the electronic device;
 a processor that executes logical instructions to arrange network access for the electronic device to one of plural networks that are available to support wireless communications of the electronic device, each of the available networks having a prearranged affiliation with the server that allows the server to provide the requesting electronic device with access credentials to the network, the logical instructions including logical instructions to:
  select one of the available networks to supply wireless communication services to the electronic device through the establishment of a network session with the electronic device, the selection of one network made by filtering the available networks using operational considerations to account for one or more performance factors relating to the network and the electronic device; and
  transmit, via the communications interface, access credentials for the selected network to the electronic device.

2. The network data server of claim 1, wherein the server receives a request for network access from the electronic device each time the electronic device is without a current network session and commences a logical operation that relies on wireless communications.

3. The network data server of claim 1, wherein the available networks are networks that have coverage at a location of the electronic device and that will provide network access to the electronic device based on a pre-established affiliation between an entity that supplied the electronic device to a user of the electronic device and the network.

4. The network data server of claim 1, wherein access to the selected network has an associated minimum level of quality of service for the electronic device and the minimum level of quality of service is measured in terms of data unit per time unit.

5. The network data server of claim 1, wherein access to the selected network has an associated minimum level of quality of service for the electronic device and the minimum level of quality of service is without regard to aggregate data use by the electronic device for a predetermined period of time.

6. The network data server of claim 1, wherein access to the selected network has an associated maximum level of quality of service for the electronic device.

7. The network data server of claim 6, wherein the maximum level of quality of service is measured in terms of data unit per time unit.

8. The network data server of claim 1, wherein the operational considerations include one or more of load balancing among the networks, predicted network performance for the electronic device in terms of quality of service or throughput, support for the type of wireless communications in which the electronic device engages, bandwidth, network throughput capacity, coverage area, cost of use, or security features.

9. A method of establishing network access for an electronic device to enable the electronic device to engage in wireless communications, comprising:

receiving, with a network data server, a request for network access from the electronic device, the electronic device not pre-programmed or pre-provisioned with access credentials to establish communications sessions with a network and has no agreement with a service provider to provide wireless communication service to the electronic device;

arranging, with the network data server, network access for the electronic device to one of plural networks that are available to support wireless communications of the electronic device, each of the available networks having a prearranged affiliation with the server that allows the server to provide the requesting electronic device with access credentials to the network, the arranging including:

selecting, with the network data server, one of the available networks to supply wireless communication services to the electronic device through the establishment of a network session with the electronic device, the selection of one network made by filtering the available networks using operational considerations to account for one or more performance factors relating to the network and the electronic device; and transmitting access credentials for the selected network from the network data server to the electronic device.

10. The method of claim 9, wherein the server receives a request for network access from the electronic device server each time the electronic device is without a current network session and commences a logical operation that relies on wireless communications.

11. The method of claim 9, wherein the available networks are networks that have coverage at the location of the electronic device and that will provide network access to the electronic device based on a pre-established affiliation between an entity that supplied the electronic device to a user of the electronic device and the network.

12. The method of claim 9, wherein access to the selected network has an associated minimum level of quality of service for the electronic device and the minimum level of quality of service is measured in terms of data unit per time unit.

13. The method of claim 9, wherein access to the selected network has an associated minimum level of quality of service for the electronic device and the minimum level of quality of service is without regard to aggregate data use by the electronic device for a predetermined period of time.

14. The method of claim 9, wherein access to the selected network has an associated maximum level of quality of service for the electronic device.

15. The method of claim 14, wherein the maximum level of quality of service is measured in terms of data unit per time unit.

16. The method of claim 9, wherein the operational considerations include one or more of load balancing among the networks, predicted network performance for the electronic device in terms of quality of service or throughput, support for the type of wireless communications in which the electronic device engages, bandwidth, network throughput capacity, coverage area, cost of use, or security features.

\* \* \* \* \*